United States Patent Office 2,910,436
Patented Oct. 27, 1959

2,910,436
METHOD OF TREATING WELLS WITH ACID

Irving Fatt, Alhambra, and Joseph F. Chittum, Whittier, Calif., assignors to California Research Corporation, San Francisco, Calif., a corporation of Delaware No Drawing. Application October 2, 1953
Serial No. 383,931

12 Claims. (Cl. 252—8.55)

This invention relates to methods for increasing the production of petroleum from subterranean formations penetrated by well bores, and is more specifically concerned with the treatment of such formations with acid to effect an increase in fluid production.

Frequently it is desirable to increase the effective permeability of a subterranean formation penetrated by a well bore to thereby increase the production of fluid therefrom. Such a permeability increase may be necessitated by the fact that the formation has a low natural permeability, or the permeability may have been decreased by abnormal conditions in the well bore, such as the presence of drilling mud or other material used in drilling the well, the presence of scale of an inorganic nature, or the blocking of the formation near the well bore by water. Numerous methods have been proposed to effect such a permeability increase, including various methods of introducing acid into the formation to remove the obstruction. In most of such prior art acidizing methods, an aqueous solution of an acid is injected into the formation in an effort to dissolve the obstructing material. However, this method has the disadvantages of producing water blocking of the treated formation by the introduction of the extraneous water and has the further disadvantage of producing an ineffective acidizing action because the acid is largely neutralized by calcareous material immediately adjacent the well bore before the acid can reach the desired portion of the formation.

In other of such acidizing methods, inorganic acid or a substance capable of forming an inorganic acid upon reaction with water is introduced into the well in a non-aqueous carrier and then an aqueous fluid is injected into the well to condition or form the acid for dissolving obstructing material. However, this method has the disadvantage of tending to produce water-blocking of the treated formation and has the further disadvantage that the strong inorganic acids used may precipitate asphalts from the crude oil in the formation and thus produce plugging of the formation.

An additional prior art method utilizes an acidizing solution containing an aqueous solution of an acid as the dispersed phase in an emulsion of acid solution in oil in an effort to avoid water-blocking of the treated formation. The use of an emulsion, however, has the disadvantage of often requiring special equipment and technique to form and requiring the use of emulsion-stabilizing substances or special relatively readily-emulsified ingredients. Also, once a stable emulsion is formed, it is often difficult to cause the emulsion to break at the desired time and the desired place in the treated formation.

The present invention contemplates a method of stimulating wells in which a solution of a liquid hydrocarbon and an organic acid is formed and injected into a well which penetrates the formation. The solution contacts the connate water in the formation, resulting in a diffusion of the acid from the hydrocarbon into the water to thereby form an effective acidizing fluid. The liquid hydrocarbon and the organic acid are preferably substantially anhydrous to provide sufficient solubility of the acid in the liquid hydrocarbon.

It is therefore an object of this invention to provide an improved method of stimulating the petroleum output of a subterranean formation by acidization.

It is an additional object of this invention to provide a method of acidizing petroliferous formations using a solution comprising a liquid hydrocarbon and an organic acid.

It is a further object of the present invention to provide a method of acidizing petroliferous formations using a solution comprising a substantially anhydrous liquid hydrocarbon and a substantially anhydrous organic acid.

In practicing the invention, the liquid hydrocarbon and the organic acid are preferably mixed outside of the well bore to form the solution. The liquid hydrocarbon utilized may be of any suitable type, such as crude oil, diesel fuel oil, kerosene, or other petroleum fractions or compounds. In some instances, it may be preferable to use highly-aromatic crude oils, highly-aromatic refined oils or pure aromatic compounds such as benzene, toluene, xylene and cumene, because of the increased solubility of organic acids in such aromatic substances. The liquid hydrocarbon selected is also preferably substantially anhydrous to provide sufficient solubility of the acid in the liquid hydrocarbon. If it is desired to use crude oil having water therein, the crude may be dried in any suitable manner as, for example, by allowing the oil to stand in a tank for a period of time to permit sufficient water to settle to reduce the water content of the crude to the desired value.

The selection of the acid utilized is determined by the requirements for reasonable strength, ready solubility in liquid hydrocarbons and in water, freedom from asphalt precipitation upon contact with crude oil in the treated formation, and freedom from precipitation of insoluble calcium and magnesium salts after reaction with the treated formation. Inorganic acids do not meet all of these requirements and, therefore, organic acids must be utilized. Of the water-soluble organic acids, the group including formic acid, acetic acid, chloracetic acid, dichloracetic acid, propionic acid, butyric acid, etc. is suitable. We have found that, of the group, acetic acid and formic acid of the monocarboxylic group are especially suitable because they meet all of the above requirements and are also relatively economical.

The acid is preferably used in substantially anhydrous form to insure ready solubility thereof in the liquid hydrocarbon and, for this reason, glacial acetic acid or anhydrous formic acid are the preferred forms of these acids. However, we have found that in the case of acetic acid, the presence therein of water in amounts up to 8% by volume will still produce satisfactory results when the acid is mixed with diesel fuel oil, and that up to 15% by volume of water may be present in acetic acid when it is mixed with kerosene. In the case of formic acid, the presence of water therein in amounts up to 2% by volume is satisfactory when the formic acid is mixed with kerosene, but the formic acid must be substantially anhydrous to obtain sufficient solubility thereof in diesel fuel oil.

The amount of the organic acid to be mixed with the liquid hydrocarbon is determined by the conditions to be encountered in the treated formation. The lower limit of acid concentration in the solution is determined by the amount of acid required to obtain a reasonable increase in the permeability of the formation. The upper limit of acid concentration is determined by the amount thereof which can be dissolved in a given amount of the liquid hydrocarbon, which in turn is determined by the solubility of the acid in the hydrocarbon and by the amount of water present in the hydrocarbon. For example, we have found that a concentration of 36 pounds of glacial acetic acid appears to be the maximum amount which is soluble in one barrel of diesel fuel oil.

After mixing of the acid and hydrocarbon components to form a solution, the solution is injected into the well bore in contact with the formation to be treated, and pressure is maintained on the solution to force it into the formation. When the solution is injected into the formation, it comes in contact with the connate water therein. Because of the increased solubility of the organic acid in water as compared to its solubility in the liquid hydrocarbon carrier, the organic acid diffuses from the liquid hydrocarbon and goes into solution with the water. Large surfaces of the connate water and the acid-in-hydrocarbon solution are in contact with each other, resulting in an effective transfer of the acid from the hydrocarbon to the water. An aqueous acidizing solution is thus formed in the formation, without introducing any additional water therein, so that there is no risk of causing water-blocking of the formation. The use of a crude oil or a refined fraction thereof as the liquid hydrocarbon also results in a beneficial flushing of the formation adjacent the well bore to increase the oil saturation therein. The acidizing mixture may be permitted to remain in contact with the formation for an extended period of time before removal, to insure acidizing of the formation.

The following table sets forth the results of laboratory experiments on the effectiveness of the acidizing method of this invention in increasing the permeability of sample cores. In these tests, cylindrical cores from various reservoirs were cleaned by extraction in toluene and dried to obtain a clean dry core. The cores were placed in an impermeable sheath so as to be open only at the ends, and were flooded with water to produce water saturation. The cores were then considered to be in substantially the same condition as a virgin petroleum reservoir and the oil permeability of the cores was measured. The cores were then flooded with a solution of glacial acetic acid and kerosene having the proportions of 12 pounds of glacial acetic acid to one A.P.I. barrel (42 U.S. gallons) of kerosene. The cores listed in Table I were flooded with 20 pore volumes of the solution, and the cores in Table II were flooded with 25 pore volumes of solution. After this flooding, the oil permeabilities of the cores were again measured.

*Table I*

| Core No. | Oil Saturation Before Treatment (Percent) | Oil Saturation After Treatment (Percent) | Change In Oil Saturation (Percent) | Oil Permeability Before Treatment (millidarcies) | Oil Permeability After Treatment (millidarcies) | Ratio of Oil Permeability After to Oil Permeability Before |
|---|---|---|---|---|---|---|
| W 6 | 71 | 77 | +6 | 130 | 139 | 1.07 |
| W 8 | 58 | 64 | +6 | 362 | 381 | 1.05 |
| W 58 | 72 | 99 | +27 | 31 | 36 | 1.18 |
| W 69 | 54 | 79 | +25 | 70 | 113 | 1.62 |
| W 125 | 59 | 65 | +6 | 86 | 105 | 1.21 |
| MC 3 | 71 | 98 | +27 | 90 | 99 | 1.10 |
| MC 11 | 63 | 66 | +3 | 55 | 64 | 1.17 |

It will be seen from this table that the acidizing method of this invention produced substantial increases in the oil permeability and oil saturation of these cores. These increases are particularly significant in view of the fact that these cores simulated virgin formations in which there were no calcium carbonate or other scale deposits present which could be acted on by the acidizing mixture to increase the oil permeability and oil saturation.

These results are also significant because there was no water-blocking of these cores. If the cores had been water-blocked, the treatment of this invention would have resulted in even larger permeability increases because of the flushing action of the liquid hydrocarbon to remove the blocking water.

The cores listed below were cleaned and dried as described above and then calcium carbonate was deposited in the cores to simulate conditions in a production formation which has calcium carbonate deposited therein. The interstitial water saturations of the cores were then established by flooding the water-saturated cores with kerosene, as above, and the cores were then flooded with 25 pore volumes of the solution of glacial acetic acid and kerosene. The oil saturations of these cores before and after acid-in-kerosene treatment could not be compared because the dissolving of a large amount of carbonate material from the cores during the tests prevented making the material balances necessary for calculating the saturations. Oil permeabilities before and after the acid-in-kerosene treatment, however, give significant results, as shown in Table II.

*Table II*

| Core No. | Oil Permeability Before Treatment (millidarcies) | Oil Permeability After Treatment (millidarcies) | Ratio of Oil Permeability After to Oil Permeability Before |
|---|---|---|---|
| B 3 | 175 | 281 | 1.60 |
| MC 23 | 21 | 89 | 4.32 |
| MC 26 | 9.3 | 23 | 2.45 |
| MC 27 | 19 | 58 | 3.12 |
| MC 28 | 40 | 75 | 1.88 |
| MC 29 | 23 | 44 | 1.90 |

Examination of Table II shows that the acidizing mixture of this invention increased the oil permeability and oil saturation of the cores containing calcium carbonate to an even greater extent than was accomplished with the cores of Table I. The results of Table II are indicative of the effect of the method of this invention on actual production formations, since many such formations are similar to the cores containing calcium carbonate deposits.

The following tables show the effectiveness of the method of this invention in eliminating water-blocking of a formation as compared to the effectiveness of the method in which the water-blocked formation is flooded with oil. In these tests, the water-saturated test cores were flooded with water at 50 p.s.i. until no further oil was produced. Half of the group of cores, as listed in Table III, were then flooded with pure kerosene, and the other half, as listed in Table IV, were flooded with a solution of glacial acetic acid in kerosene. Table III shows that flooding with pure kerosene did restore some of the oil permeability. However, Table IV shows that the oil permeabilities of those cores which were flooded with the acid-in-kerosene solution were completely restored and, in fact, were increased to values greater than the original oil permeabilities.

*Table III*

[Cores flooded with pure kerosene after water flooding]

| Core No. | Oil Permeability Before Water Flooding (millidarcies) | Oil Permeability After Kerosene Flooding (millidarcies) | Percent Oil Permeability Restored |
|---|---|---|---|
| MC-31 | 102 | 67 | 66 |
| MC-32 | 120 | 55 | 46 |
| MC-33 | 94 | 63 | 67 |
| MC-34 | 105 | 74 | 70 |
| MC-35 | 149 | 79 | 53 |
| MC-36 | 136 | 111 | 82 |

Table IV

[Cores flooded with solution of glacial acetic acid in kerosene after water flooding]

| Core No. | Oil Permeability Before Water Flooding (millidarcies) | Oil Permeability After Acid-in-Oil Solution Flooding (millidarcies) | Percent Oil Permeability Restored |
|---|---|---|---|
| MC-37 | 127 | 135 | 106 |
| MC-38 | 127 | 132 | 104 |
| MC-39 | 107 | 175 | 163 |
| MC-40 | 59 | 120 | 202 |
| MC-41 | 136 | 140 | 102 |
| MC-42 | 128 | 133 | 104 |

A possible explanation for the increased effectiveness of the method of this invention in increasing the oil permeability of sandstone reservoirs containing connate water is as follows. It appears that in a water-wet sandstone, which condition is representative of most sandstone reservoirs, the water covers the surface of the sand and cementing particles and is accumulated in the interstices, while the oil or gas present appears to be in the center of the pore spaces. When the solution of this invention, comprising an organic acid and a liquid hydrocarbon, is injected into the reservoir or formation, for a given pressure of such injection, the volume of water present in a given bulk volume of the reservoir will be determined by the size and shape of the pores in the reservoir and the interfacial tension. This volume of water present will thus determine the oil permeability of the reservoir.

As the acid-in-hydrocarbon solution is injected into the formation, the acid diffuses into the water in the reservoir and the acidified water reacts with the solid carbonate material of the reservoir. This reaction produces bubbles of carbon dioxide gas in the water and the volume of these bubbles adds to the apparent volume of the water present. However, the apparent volume of the water cannot be greater than the actual volume thereof at the start of treatment, because of the necessity for capillary equilibrium between the water and oil at the given injection pressure. Therefore, the gas bubbles force an equal volume of water ahead of the injected acidizing solution, which, in a radial oil well system, results in the water being moved back into the formation or reservoir away from the well bore. The gas bubbles in the water soon either go into solution in the water or cross the oil-water interface and flow with the oil. The volume of the water remaining in the treated portion of the formation is therefore decreased below the volume predicted for equilibrium at the given injection pressure.

This reduction in water content acts to increase the effective oil permeability of the reservoir near the well bore, since the water which is forced away from the well bore by the gas bubble pressure is not as effective in reducing oil permeability in its new position as when it was in the critical permeability zone adjacent the well bore. Thus, the method of this invention acts to dissolve carbonates present in the formation, remedies water-blocking of the formation adjacent the well bore, and flushes the formation adjacent the well bore with the liquid hydrocarbon acting as a carrier for the acid.

In a test of the method of this invention on a producing formation, a solution comprising 1200 pounds of glacial acetic acid and 100 barrels of diesel fuel oil was injected into a well, and the well was shut in under pressure for 24 hours. Prior to this treatment, the well had been producing 7 barrels of oil per day and 35 barrels of water. After this treatment, and after recovery of the 100 barrels of oil used in the treatment, the well produced an average of 10 barrels of oil per day and 55 barrels of water per day. It will be seen that this represents a substantial increase in the oil production from this formation, and it will be further noted that the water production of the formation was increased by the treatment to about the same extent as the oil production, indicating that the method of this invention is very effective in increasing the total fluid permeability of the formation.

An additional well, which had been producing 9 barrels of oil per day and 50 barrels of water per day was treated by the method of this invention with a solution comprising 3600 pounds of glacial acetic acid and 300 barrels of diesel fuel oil. After being shut in for 48 hours and after recovery of the treating oil, the well produced an average of 15 barrels of oil per day and 165 barrels of water per day, again indicating the effectiveness of the method of this invention in increasing the permeability of subterranean formations.

Although but a few embodiments of the present invention have been described, it will be apparent to those skilled in the art that various changes and modifications may be made therein without departing from the spirit of the invention or the scope of the appended claims.

We claim:

1. The method of increasing the productivity of a subterranean formation having connate water therein and penetrated by a well bore comprising the steps of forming a solution of glacial acetic acid and a liquid hydrocarbon, introducing said solution into said well bore in contact with said formation and contacting said solution with said connate water to release said acid from said solution to acidize said formation.

2. The method of increasing the productivity of a subterranean formation having connate water therein and penetrated by a well bore comprising the steps of forming a solution of anhydrous formic acid and a liquid hydrocarbon, introducing said solution into said well bore in contact with said formation and contacting said solution with said connate water to release said acid from said solution to acidize said formation.

3. The method of increasing the productivity of a subterranean formation having connate water therein and penetrated by a well bore comprising the steps of forming a solution of glacial acetic acid and diesel fuel oil, introducing said solution into said well bore in contact with said formation and contacting said solution with said connate water to release said acid from said solution to acidize said formation.

4. The method in accordance with claim 3, wherein the concentration of said glacial acetic acid in said diesel fuel oil is from 12 to 36 pounds per barrel.

5. The method of increasing the productivity of a subterranean formation having connate water therein and penetrated by a well bore, comprising the steps of forming a solution of acetic acid in Diesel fuel oil, the water content of said acetic acid not exceeding 8% by volume, introducing said solution into said well bore in contact with said formation, and contacting said solution with said connate water to release said acid from said solution to acidize said formation.

6. The method of increasing the productivity of a subterranean formation having connate water therein and penetrated by a well bore, comprising the steps of forming a solution of acetic acid and kerosene, the water content of said acetic acid not exceeding 15% by volume, introducing said solution into said well bore in contact with said formation, and contacting said solution with said connate water to release said acid from said solution to acidize said formation.

7. The method of increasing the productivity of a subterranean formation having connate water therein and penetrated by a well bore comprising the steps of forming a solution of formic acid and kerosene, the water content of said formic acid not exceeding 2% by volume, introducing said solution into said well bore in contact with said formation, and contacting said solution with said connate water to release said acid from said solution to acidize said formation.

8. The method of increasing productivity of a subterranean formation containing connate water and penetrated by a well bore comprising the steps of forming a solution of a liquid hydrocarbon and a monocarboxylic aliphatic acid containing from one to four carbon atoms per molecule, introducing said solution into said well bore in contact with said formation and contacting said solution with said connate water to release said acid from said solution to acidize said formation.

9. The method of claim 8 wherein said monocarboxylic aliphatic acid contains not more than 15% water.

10. The method of claim 8 in which said monocarboxylic aliphatic acid is substantially anhydrous.

11. The method of acidizing an earth formation comprising calcareous and siliceous matter which comprises injecting into the earth formation a solution of glacial acetic acid in a petroleum liquid, said solution being free from water.

12. The method of acidizing an earth formation comprising calcareous and siliceous matter which comprises injecting into the earth formation a solution of a monocarboxylic aliphatic acid containing from one to four carbon atoms per molecule in a petroleum liquid, said solution being free from water.

References Cited in the file of this patent

UNITED STATES PATENTS

| | | |
|---|---|---|
| 2,059,459 | Hund et al. | Nov. 3, 1936 |
| 2,206,187 | Herbsman | July 2, 1940 |
| 2,343,136 | Dobson et al. | Feb. 29, 1944 |
| 2,358,562 | Dismukes | Sept. 19, 1944 |
| 2,681,889 | Menaul et al. | June 22, 1954 |